(12) United States Patent
Shimura et al.

(10) Patent No.: US 7,050,292 B2
(45) Date of Patent: May 23, 2006

(54) CASE FOR PORTABLE EQUIPMENT

(75) Inventors: Tokio Shimura, Kariya (JP); Mitsuru Nakagawa, Chiryu (JP)

(73) Assignee: Denso Corporation, Kariya (JP)

( * ) Notice: Subject to any disclaimer, the term of this patent is extended or adjusted under 35 U.S.C. 154(b) by 282 days.

(21) Appl. No.: 10/682,885

(22) Filed: Oct. 14, 2003

(65) Prior Publication Data
US 2004/0090737 A1    May 13, 2004

(30) Foreign Application Priority Data
Oct. 30, 2002    (JP) .............................. 2002-315800

(51) Int. Cl.
*G06F 1/16*    (2006.01)

(52) U.S. Cl. ...................... 361/679; 361/683; 206/307; 200/302.2; 200/512; 29/622

(58) Field of Classification Search ................ 361/679, 361/683, 752, 800, 816, 818; 174/35 R, 174/35 GC, 35 MS; 200/5 A, 512, 517, 200/341, 302.1, 293–298; 428/344, 411.1, 428/421, 432; 264/298, 299, 300, 319, 331.11; 427/248.1, 490, 497; 219/518, 519
See application file for complete search history.

(56) References Cited

U.S. PATENT DOCUMENTS

| | | | | |
|---|---|---|---|---|
| 3,978,297 | A | * | 8/1976 | Lynn et al. ................ 200/5 A |
| 5,351,051 | A | * | 9/1994 | Yano et al. ................. 341/176 |
| 6,023,033 | A | * | 2/2000 | Yagi et al. ................... 200/512 |
| 6,093,900 | A | * | 7/2000 | Wisskirchen et al. .... 200/302.2 |
| 6,180,896 | B1 | | 1/2001 | Naritomi |
| 6,413,630 | B1 | * | 7/2002 | Nakayama .................. 428/344 |
| 6,455,796 | B1 | * | 9/2002 | Kashino ..................... 200/512 |
| 6,462,291 | B1 | * | 10/2002 | Sachs ...................... 200/302.2 |
| 6,571,457 | B1 | * | 6/2003 | Naritomi ..................... 29/622 |
| 6,573,463 | B1 | * | 6/2003 | Ono .......................... 200/5 A |
| 6,768,654 | B1 | * | 7/2004 | Arnold et al. .............. 361/818 |
| 6,862,148 | B1 | * | 3/2005 | Kakinoki et al. ........... 359/808 |

FOREIGN PATENT DOCUMENTS

| | | | |
|---|---|---|---|
| CN | 1262598 | | 8/2000 |
| JP | 406268548 A | * | 9/1994 |
| JP | 410172379 A | * | 9/1994 |
| JP | 8-140812 | | 6/1996 |

* cited by examiner

*Primary Examiner*—Michael Datskovskiy
(74) *Attorney, Agent, or Firm*—Posz Law Group, PLC

(57) ABSTRACT

A case of a portable equipment for communication to an external system comprises a body portion and an operation portion acting as a function member. At least a portion of the case is provided with a decorative film having a resin film having transparency and a print layer printed on a back surface of the resin film in a predetermined pattern, and a resin base member formed on a back surface of the decorative film so as to contact the print layer. The front surface of the decorative layer is exposed as a most outside surface of the case.

13 Claims, 8 Drawing Sheets

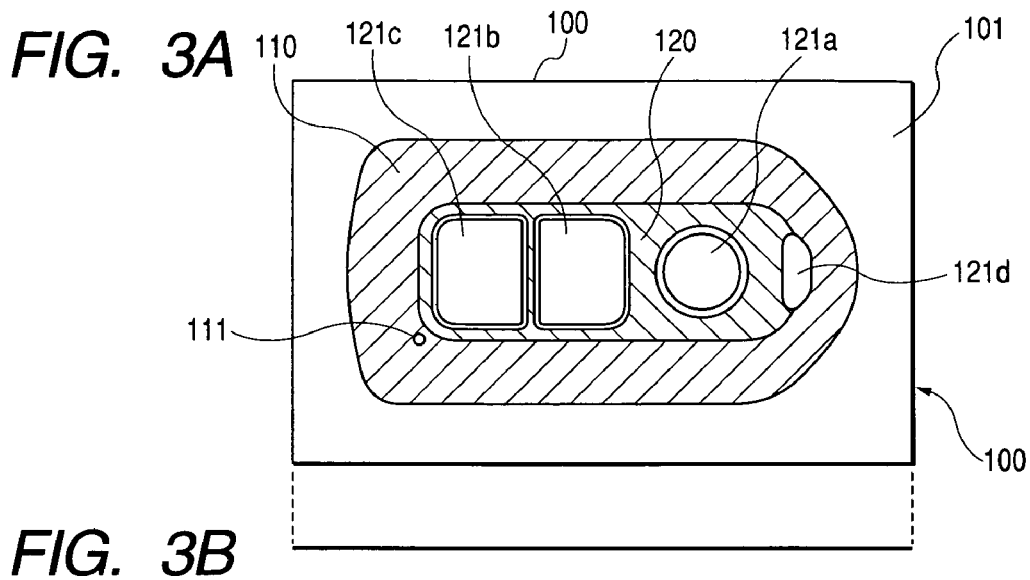
FIG. 3A
FIG. 3B
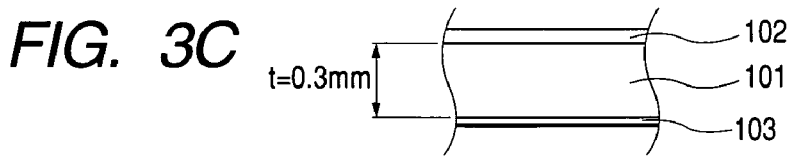
FIG. 3C
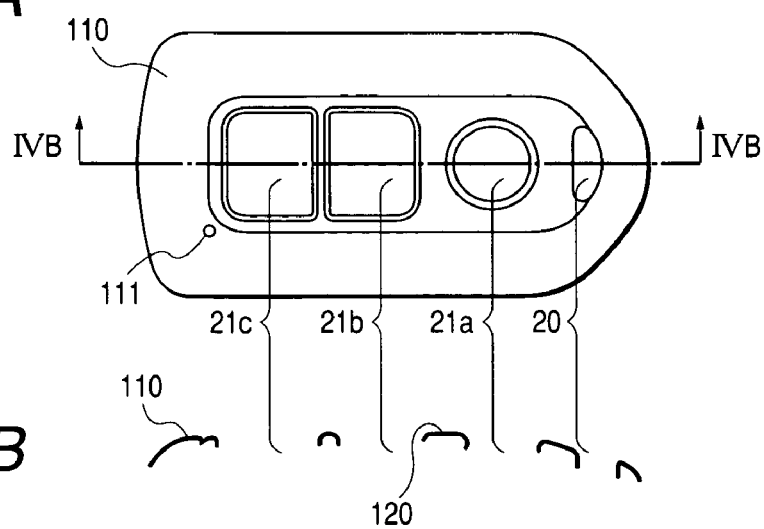
FIG. 4A
FIG. 4B

CASE FOR PORTABLE EQUIPMENT

BACKGROUND OF THE INVENTION

The present invention relates to a case for a portable equipment such as transmitter for key-less entry system of a vehicle.

There has been known a key-less entry system as a remotely controllable auxiliary means for a vehicle, which is provided with a portable equipment such as transmitter. The portable equipment is accommodated in a case having a case body generally colored with black. Further, in an event where color changing is effected to the case entirely or partially, the coloring is effected with resin or two-color formation. This coloring method has been considered to be undesirable in an impact in design, and especially, in the case of two-color formation, a fusing (fused) portion, at which the colors are different, provides a weak strength, thus being inconvenient.

Moreover, although as is well seen in a portable phone, for example, a UV coating of metallic color to a surface of the case has been considered, a portable equipment such as for keyless entry system is often engaged with a key holder or key ring together with keys formed of metal. In such case, there is a fear that the surface of the portable equipment may be injured by such metal keys and the durability of the portable equipment may be made worse.

Furthermore, in a case of a portable equipment of a type using an electric wave transmission, if the case body is coated with metallic material, the metallic coat film formed on the surface of the case body provides a considerably large thickness, and because of the metal contained in this coat film, permeability or transmission of the electric wave may be deteriorated thereby.

Furthermore, there is known a printing technology, in which a printing of an opaque, not transparent, ink is made on t transparent resin sheet. In such technology, when a light is projected, a pattern of the printing is made visible through the transparent sheet. There is known a coaster to which such printing technology is applied.

SUMMARY OF THE INVENTION

The present invention was conceived in consideration of the defects or inconveniences encountered in the prior art mentioned above and an object of the present is therefore to provide a case of a portable equipment having a surface capable of being decorated and being hard to be injured or damaged.

Another object of the present invention is to provide a case for a portable equipment having a surface coated with metallic color film having a high electric wave permeability.

These and other objects can be achieved according to the present invention by providing, in one aspect, a case of a portable equipment for communication to an external system comprising:

a body portion; and an operation portion acting as a function member, wherein at least a portion of the body portion and the operation portion is provided with: a decorative film having a resin film having transparency and a print layer printed on a back surf ace of the resin film in a predetermined pattern; and a base member resin portion formed on a back surface of the decorative film so as to contact the print layer, and the decorative layer has a front surface exposed as a most outside surface of the case.

According to the invention of this aspect, the decorative film having a transparent base film, to the back surface of which a printed layer having a predetermined print pattern is formed, is disposed to at least a portion of the case so that the front surface of the decorative film is disposed to the most outside surface portion of the case. According to this structure, the printed layer can be protected between the transparent film and the resin base member, so that the predetermined printed pattern of the printed layer can be free from external damage by, for example, a metallic key.

In addition, the case is applicable to another portable equipment having different function only by changing the pattern to be printed on the print layer.

In preferred embodiments of the above aspect, there are some advantageous features will be provided.

That is, a transparent protection film may be formed to the front surface of the resin film. In an arrangement in which this transparent protection film is disposed most outside the case, the transparency of the resin film can be preferably maintained.

The print layer may be formed of a material containing a metallic component to thereby provide a metallic feeling to the outside surface of the case through the transparent resin film.

The case body has an inner hollow structure in which an antenna element for transmission may be disposed. Since, in the present invention, the print layer has a thin thickness, the electric wave transmission is less reduced even though the print layer contains the metallic component, and thus, the lowering of the transmitting ability can be minimally suppressed.

The operation portion includes knob pieces for inputting operation modes and the knob pieces have front surfaces covered by the decorative film, thus being capable of protecting the knob member by the decorative film.

The print layer of the decorative film has a portion which covers the knob pieces and to which patterns representing contents of functions are printed. Therefore, the functions of the knob pieces can be easily recognized by a user.

The front surface of the decorative film may be provided with a marked or stamped portion formed as a protruded or recessed portion, which can enhance the touch feeling of a user.

The body portion and the operation portion may be covered integrally by the decorative film. According to this structure, the intrusion of water component or dust and the like into the case body can be prevented. The integral formation of the body portion and the operation portion of the case can contribute to cost reduction.

On the other hand, the body portion and the operation portion may be covered by independent decorative films, respectively. According to this structure, the decorative film may be formed for each of the operation portions having different functions.

The decorative film has an end portion intruding into the base member resin portion to thereby prevent the decorative film from being peeled off from the base member of the case.

The body portion may be formed from two half portions so as to have an inner hollow portion when assembled and the operation portion is formed to one of the two half portions. According to this structure, the case can be easily manufactured with a simple forming device.

In another aspect, the present invention provides a case of a portable equipment for communication to an external system comprising:

a body portion having an inner hollow structure in which an antenna element is disposed for communication to the external system; and an operation portion acting as a function member having a surface on which knob pieces for inputting operation modes are formed, wherein at least a portion of the body portion and the operation portion is provided with: a decorative film having a resin film having a front surface on which a transparent protection film is formed and a print layer printed on a back surface of the resin film in a predetermined pattern, the print layer containing a metallic component; and a base member resin portion formed on a back surface of the decorative film so as to contact the print layer, and the transparent protection film is disposed as a most outside surface of the case.

The nature and further characteristic features of the present invention will be made more clear from the following descriptions with reference to the accompanying drawings.

BRIEF DESCRIPTION OF THE DRAWINGS

In the accompanying drawings:

FIG. 3 includes FIG. 3A being a plan view showing a decoration film effected to an upper cover of the portable equipment of FIG. 1, FIG. 3B being a side or sectional view of FIG. 1 and FIG. 3C being an enlarged sectional view of a portion of FIG. 3B;

FIG. 4 includes FIG. 4A being a plan view showing a decorative film applied to an upper cover of the portable equipment of FIG. 3 after the forming working and FIG. 4B being a sectional view taken along the line IVB—IVB in FIG. 4A;

DESCRIPTION OF THE PREFERRED EMBODIMENT

Preferred embodiments of the present invention will be described hereunder with reference to the accompanying drawings. It is to be noted that, in the following descriptions, terms of "upper", "lower" and the like are used with reference to the illustrated state.

First Embodiment

Figure 1:
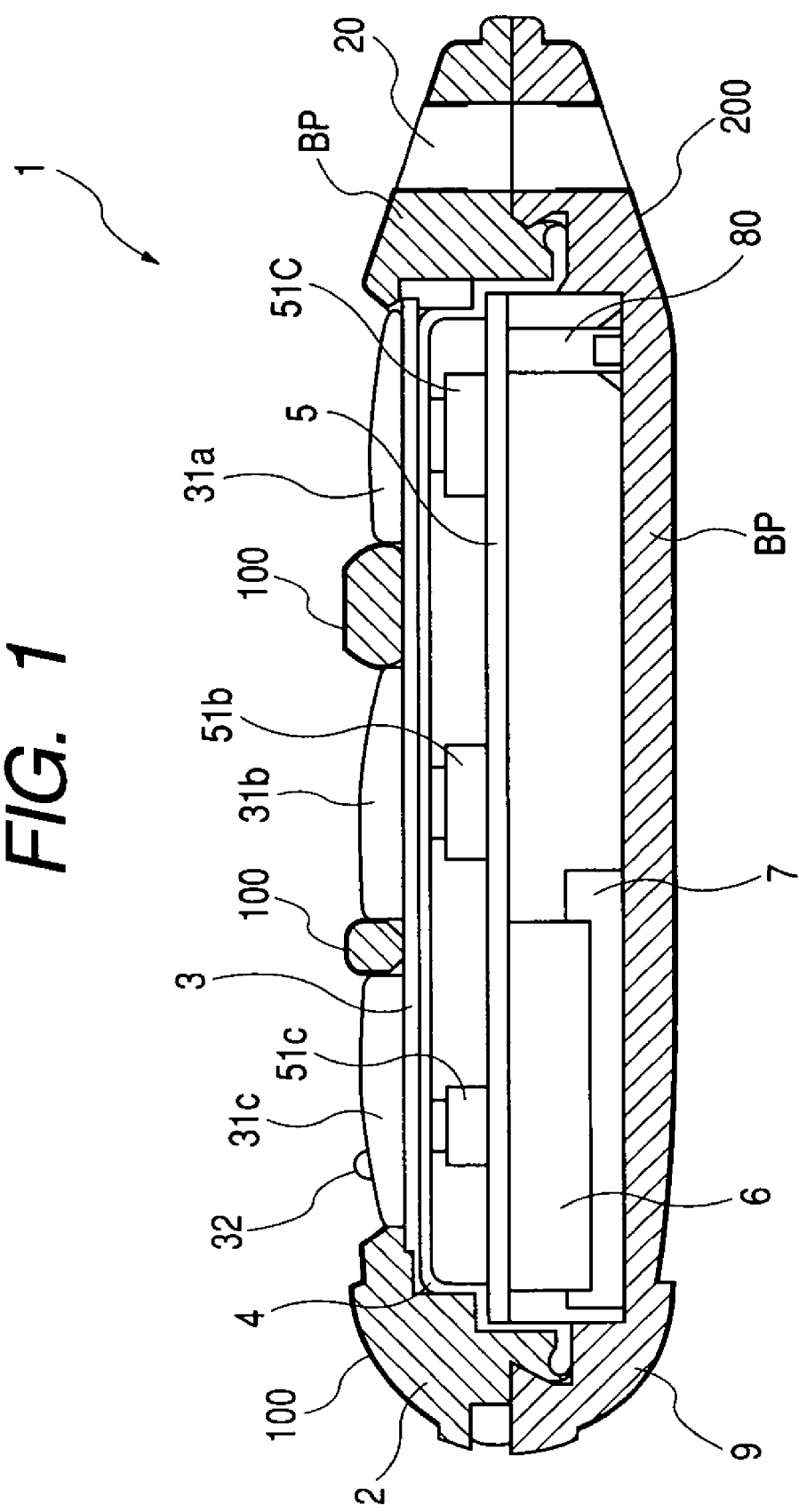
FIG. 1 is a longitudinal sectional view of a portable equipment as a key-less entry system according to one embodiment of the present invention.

The first embodiment of the present invention will be first described with reference to FIGS. 1 and 2.

A portable equipment 1 comprises upper and lower case covers 2 and 9 which constitute an outer case and elements disposed in an inner space defined by the upper and lower case covers 8 and 9 when assembled into the case. As best illustrated in FIG. 2, the elements include: a knob member 3; a water-proof cover 4; a circuit board 5 provided with switching elements 51a to 51c on its upper surface and an antenna element 6 on its lower surface; a cushion member 7 disposed between the antenna element 6 and the lower case cover 9 for damping a shock to the antenna element 6; a cell terminal 81; a cell case 82; a button cell 83; and a spacer 80 supporting the circuit board 5 from the lower case cover 9, in substantially the described order. Further, other circuit elements disposed on the lower surface of the circuit board are omitted from the illustration in FIG. 1.

Figure 2:
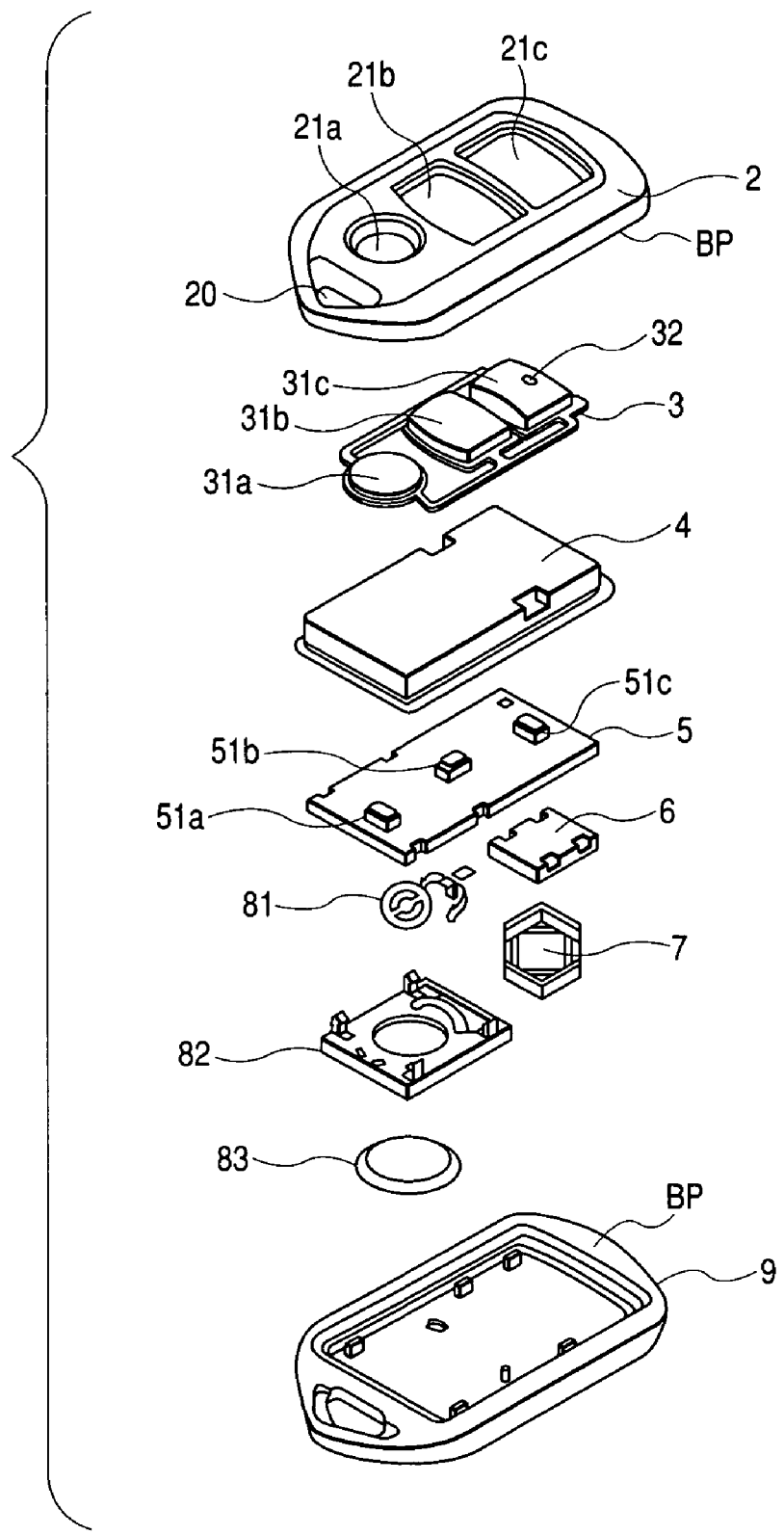
FIG. 2 is a developed perspective view of the portable equipment of FIG. 1.

Referring to FIG. 2, the knob member 3 includes knob pieces 31a, 31b and 31c each formed in shape of protrusion from a decorative film 100, which will be mentioned hereinlater in detail, and the switching elements 51a, 51b and 51c formed on the upper surface of the circuit board 5 are arranged below the respective knob pieces 31a, 31b and 31c through the water-proof cover 4 made of silicone resin. Further., the knob piece 31c is provided, at its upper surface, with a projection piece 32 so as to be easily distinctive from the other knob pieces 31a and 31b.

Hereunder, with reference to FIGS. 1 to 9, the formation method of the upper case cover 2, the lower case cover 9 and the knob member 3 with the decorative film 100 will be described.

As shown in FIG. 3 (FIGS. 3A to 3C), the decorative film 100 is made of polycarbonate PC, having light transmittancy, and has thickness t of 0.3 mm (t=0.03 mm). More specifically, the front surface of the transparent resin film 101 (corresponding to the most outside surface of the portable equipment 1) is entirely coated with a transparent protective film 102 of hard-coat agent, and a print (printed or printing) layer 103 is formed on the rear (back) surface of the resin film 101 (corresponding to a surface of the upper case cover 2 contacting a base member BP formed of resin for the upper case cover 2).

The print layer 103 comprises two-color printing portions including a metallic printing portion 110 formed of an ink containing metallic component such as aluminium powder and a body color printing portion 120 formed of an ink having a body case color (black in this embodiment). These metallic printing portion 110 and body color portion 120 constitute a body portion of the upper case cover 2.

The metallic printing portion 110 is formed with an LED (light emitting diode) portion 111 on which any printing is not applied in order to transmit the emitting light of the LED, not shown, indicating an operation mode of the portable equipment 1. On the other hand, the body color printing portion 120 is formed with holes 21a to 21c, for the knob member 3 as function (operation) member, corresponding to non-printed portions 121a to 121c and a non-printed portion 121d corresponding to a keeling hole 20.

Incidentally, in order to provide a metallic feeling to the case body, it is generally required to apply the coating so that the coated film provides a thickness of about 30 μm, and in such coated film, the metallic component is contained, which adversely affects on the transmission performance of the electric wave, thus being inconvenient.

On the contrary, in the printed layer 103 of the described embodiment of the present invention, the metallic color printing portion 110 and the body color printing portion 120 each merely has a thickness of about 3 μm. Accordingly, the metallic feeling can be provided by the less amount of the metallic component of the metallic printing portion 110 and, in addition, an adverse influence on the electric wave transmission performance of the antenna element 6 in the portable equipment 1 can be minimally suppressed.

In the next step, the decorative film 100 shown in FIG. 3A is subjected to a forming working by using a die, not shown. Further, FIG. 4A shows a plan view of the decorative film 100 after the forming working.

In the forming working, an end portion of the decorative film 100 is cut, and a three-dimensional formation along the surface shape of the upper case cover 2 is performed. The forming of the knob holes 21a to 21c and the keeling hole 20 are also performed. In the three-dimensional formation of the decorative film 100, the projection 32 to the knob piece 31c will be also formed.

The decorative film 100 subjected to the forming working is set to a molding machine, not shown. Then, the resin base member formed of polycarbonate (PC) is injected on the side of the printing layer 103 by the film in-mold method to thereby form the upper case cover 2.

Figure 5A:
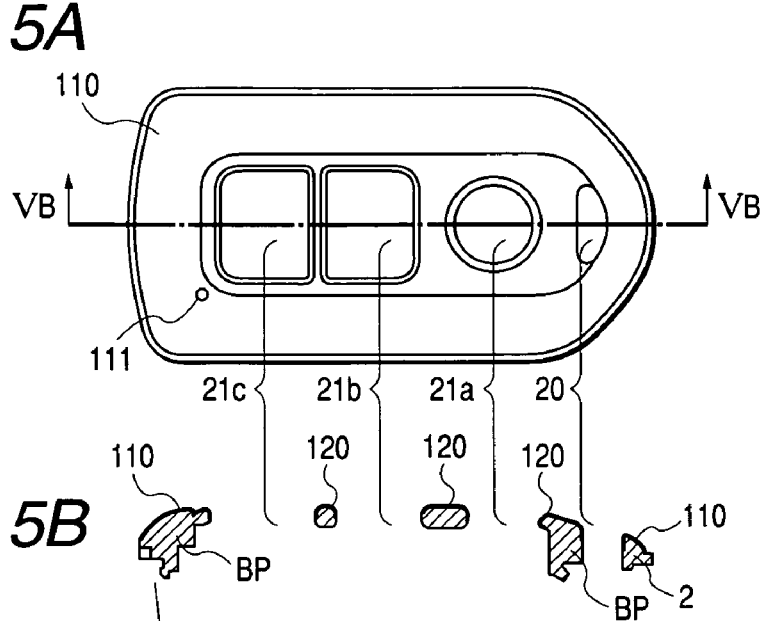
FIG. 5 includes FIG. 5A being a plan view showing an upper cover of the portable equipment of FIG. 1 after the film in-mold formation, FIG. 5B being a sectional view taken along the line VB—VB in FIG. 5A and FIG. 5C being an enlarged sectional view of an end portion of the upper cover of FIG. 5B.
Figure 5B:
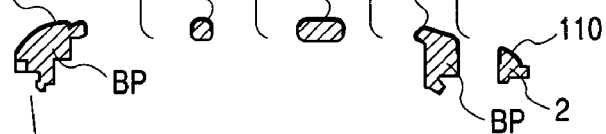
Figure 5C:
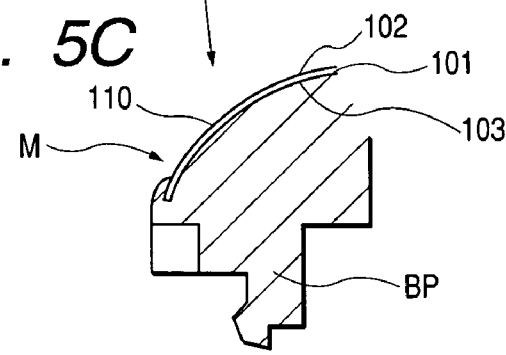

FIG. 5A shows a plan view of the upper cover 2 formed by this film in-mold method, FIG. 5B is a sectional view taken along the line VB—VB in FIG. 5A and FIG. 5C is an enlarged sectional view showing an end portion M of the decorative film 100.

At the time of the in-mold formation, the resin material for the base member BP moves and turns so as to catch the end portion M of the decorative film 100 in a manner that this end portion M enters into the base member BP. Hence, the end portion M of the decorative film 100 is not exposed externally, so that the decorative film 100 can be prevented from being peeled off from the resin base member BP.

Furthermore, the material of the resin film 100 of the decorative film 100 is the same as the material of the resin base member BP, that is, both being formed of PC (polycarbonate). Accordingly, both the materials have the same linear expansion coefficient, so that both the resin film 101 of the decorative film 100 is not peeled off from the resin base member BP after the in-mold formation.

The lower case cover 9 of the portable equipment 1 according to the described first embodiment will be manufactured substantially the same manner or steps as those mentioned above with reference to the upper case cover 2.

Figure 6:
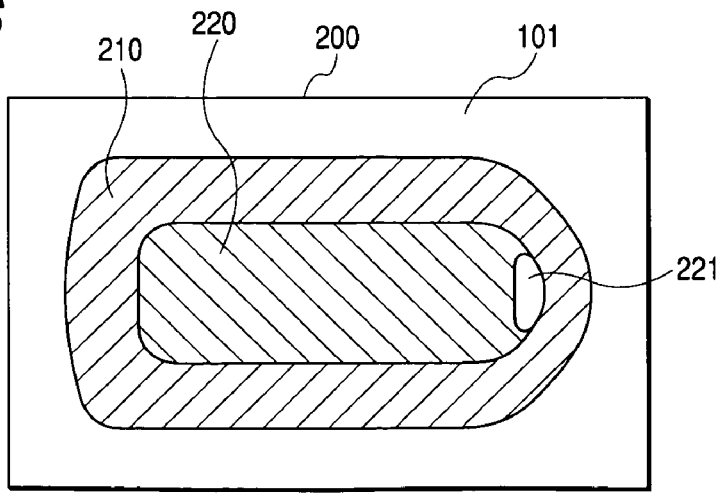
FIG. 6 is a plan view of a decorative film of a lower cover of the case of the portable equipment of FIG. 1.
Figure 7A:
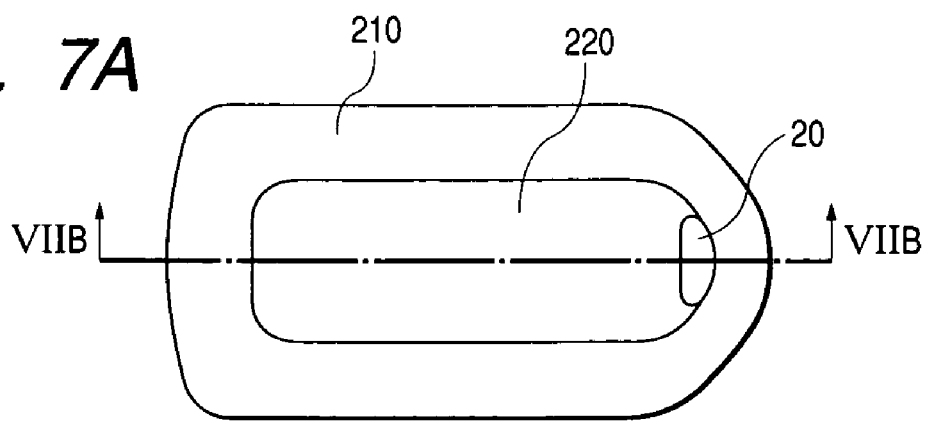
FIG. 7 includes FIG. 7A being a plan view showing a decorative film applied to the lower cover of the portable equipment of FIG. 6 after the forming working and FIG. 7B being a sectional view taken along the line VIIB—VIIB in FIG. 7A.
Figure 7B:
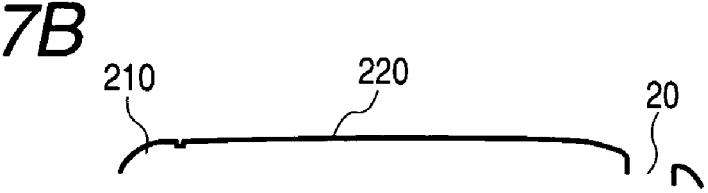
Figure 8A:
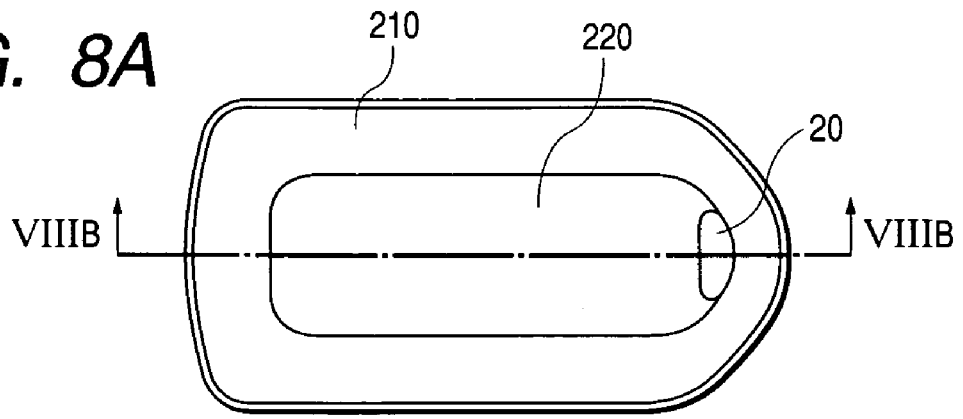
FIG. 8 includes FIG. 8A being a plan view showing the lower cover of the portable equipment of FIG. 1 after the film in-mold formation, and FIG. 8B being a sectional view taken along the line VIIIB—VIIIB in FIG. 8A.
Figure 8B:
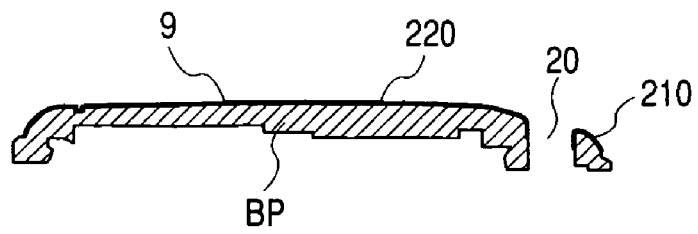

Referring to FIGS. 6 to 8, reference numeral 200 denotes a decorative film of the lower case cover 9. A resin film 201 is formed of a polycarbonate resin and has a front surface on which a transparent protective film 102 of hard-coat agent is formed and a back (rear) surface on which a black body color printing portion 220 is formed. The resin film 201 is then subjected to the forming working for cutting the end portion, forming the keeling hole and carrying the three-dimensional molding. The formed decorative film 210 is molded through the in-mold process with the polycarbonate resin base member BP to thereby form the lower case cover 9.

Further, a mark, not shown, showing a maker, a kind of car, or like may be formed on the surface of the lower case cover 9 of the portable equipment 1 by forming, through for example stamping process, protrusion or recess on the surface of the decorative film 210 at the time of forming working.

On the other hand, as to the knob member 3, decorative films 310, 320 decorated for the knob member (knob pieces) is formed through the forming working substantially identical to that for the decorative film 100 or 200.

Figure 9A:
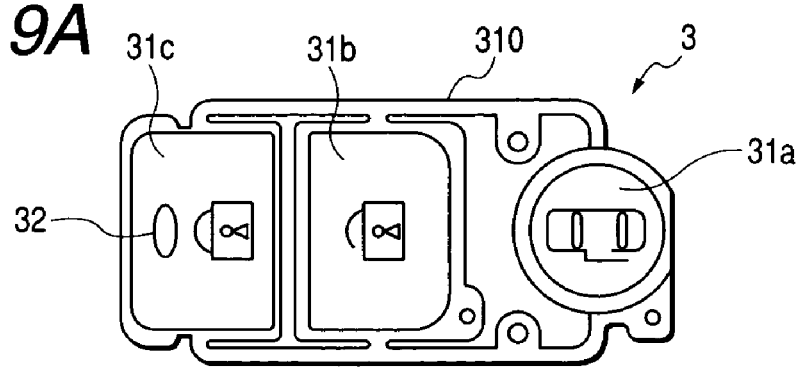
FIG. 9 includes FIGS. 9A and 9B both showing a plan view of a decorative film of a knob member after the forming working of the embodiment of FIG. 1.

With reference to FIG. 9, FIG. 9A shows one example of the knob member of a portable equipment for a one-box car, in which patterns respectively showing the knob piece 31c for a door-lock switch, the knob piece 31b for a door-unlock switch and the knob piece 31a for a slide-door opening switch are multi-color printed, as switch pattern print portions, on the back surface of the decorative film 310.

Figure 9B:
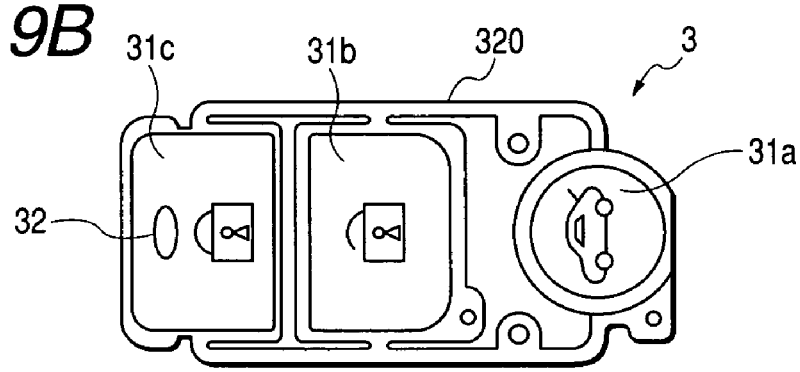

On the other hand, FIG. 9B shows one example of the knob member of a portable equipment for a sedan-type vehicle, in which a pattern showing a knob piece 311a for a trunk-unlock switch is multi-color printed on the back surface of a decorative film 320 in place of the slide-door opening switch.

Thus, according to the first embodiment of the present invention, it is possible to manufacture or provide a case of the potable equipment capable of being utilized for cars of different types or kinds, or different functions merely by changing the print (printing or printed) pattern.

Further, since the back surface of the knob member 3 contacts the switches 51a to 51c through the water-proof cover 4 at the switching time, it may be desired to apply the hard-coat agent on the surface of the printed layer 103 of the knob member 3 so as to protect the layer 103.

As mentioned hereinabove, according to the first embodiment of the present invention, the upper case cover 2, the lower case cover 9 and the knob member 3 can be formed by utilizing or using the decorative films 100, 200, 310, 320, which are subjected to the three-dimensional molding. Each of these decorative films is formed from the transparent polycarbonate resin film 101 which has the front surface on which the transparent protective film of the hard-coat agent is formed and has the back surface on which the printed layer 103 provided with the metallic print portion 110 (210) and the body color print portion 120 (220) or switch pattern printed portion 31a (31b, 31c, 311a) are formed. Thereafter, the upper and lower case covers 2 and 9 are formed by the film in-mold method, i.e., injection-molding the resin BP for the base member on the printed layer side of the back (rear) surface of the decorative film 100 (200) which has been subjected to the forming working.

Accordingly, the transparent protective film 102 as the surface of the decorative film 100 (200) is exposed on the most outside surface of the portable equipment. Moreover, since the printed layer 103 is sandwiched between the resin film 101 and the resin base member BP on the back surface of the decorative film 100 (200), it becomes possible to prevent the printed layer 103 from being damaged by a metallic member such as key of an automobile, and in addition, the printed layer 103 can be seen from the outside of the portable equipment case through the transparent protective film 102 and the transparent resin film 101.

Still furthermore, it is possible to make thin the thickness of the printed layer 103 containing the metallic component of an amount leas than the coat film thickness, so that the metallic feeling can be given to the case of the portable equipment 1 by the formation of the metallic printed portion 110 (210), and in addition, an adverse influence to the electric wave transmission performance of the antenna element 6 disposed inside the portable equipment 1 can be made minimal.

Thus, according to the first embodiment of the present invention, there can be provided a portable equipment case decorated by the metallic color coat and body color coat having good durability and having less influence to the electric wave transmission performance of the integrated antenna element.

Second Embodiment

In the first embodiment mentioned above, the upper case cover 2 and the lower case cover 9 are formed as independent members, whereas in this second embodiment, both the case covers are formed integrally, and this second embodiment differs from the first embodiment in a structure that two switch knobs are integrally formed to the upper case cover 2. According to this viewpoint, only the upper case cover 2 is explained hereunder through its manufacturing process with reference to FIGS. 10 to 12.

Figure 10:
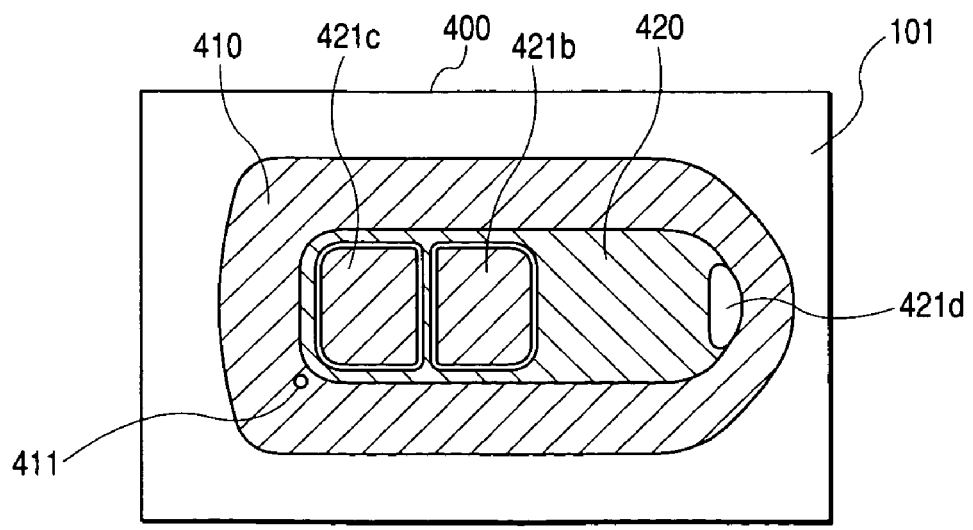
FIG. 10 is a plan view of a decorative film of an upper cover of a case of a portable equipment according to another embodiment of the present invention.

FIG. 10 is a plan view of a decorative film 400 according to this second embodiment, in which the resin film 101 made of polycarbonate (PC) and having a thickness t=0.3 mm and the transparent protection film 102 made of UV hard coat agent are the same as those in the first embodiment.

The print (printed or printing) layer 103 includes, as like as in the first embodiment, an metallic printed portion 410, as a body portion, of ink including metallic component and a body color print portion 420 printed with black color and also is provided with knob printed portions 421b, 421c printed with brown as a control (function or operation) portion. As like as the first embodiment, the metallic printed portion 410 includes an LED portion 411, at which no printing is made, and the body color printed portion 420 is formed with a non-printed portion 421d for a keeling hole.

Figure 11A:
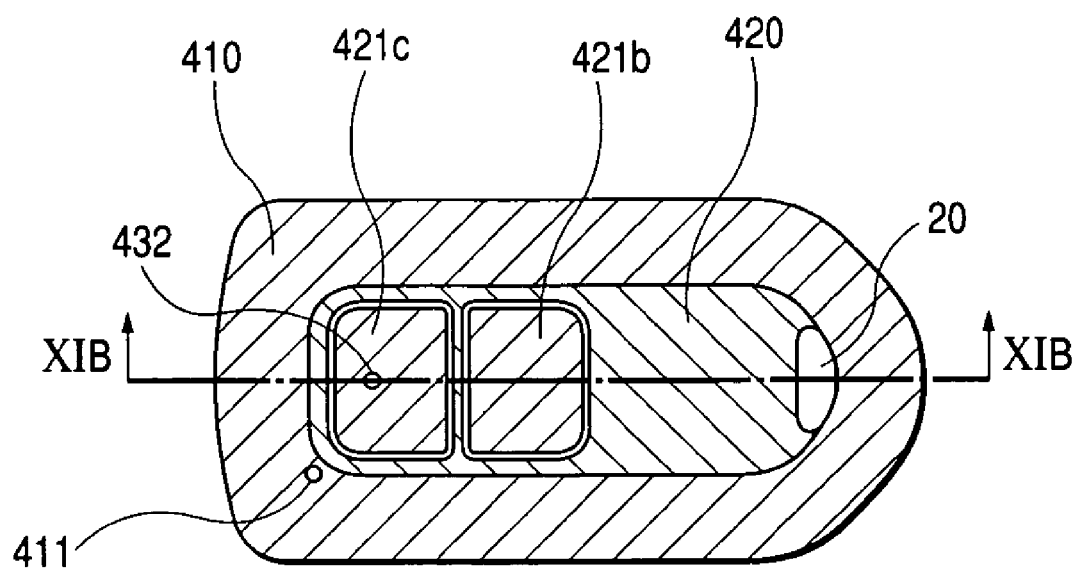
FIG. 11 includes FIG. 11A being a plan view showing a decorative film effected to the upper cover of the portable equipment of according to the embodiment of FIG. 10 after the forming working and FIG. 11B being a sectional view taken along the line XIB—XIB in FIG. 11A.

The thus formed decorative film 400 is subjected to a forming working by means of die, not shown, as like as the first embodiment. FIG. 11A is a plan view of the decorative film 400 after the forming working and FIG. 11B is a sectional view thereof taken along the line XIB—XIB.

Figure 11B:
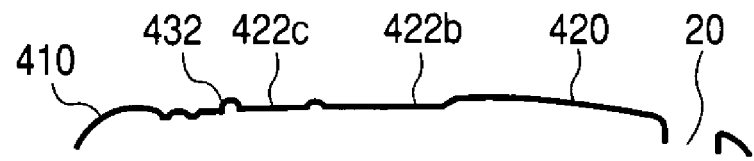

As shown in FIG. 11B, in the forming working in this second embodiment, the keeling hole 20 is formed and the knob printed portions 421b, 421c are formed in shape of protrusion without being formed as a hole or like. Moreover, a projection 432 is formed to the surface of the knob printed portion 421c for knob discrimination.

Figure 12A:
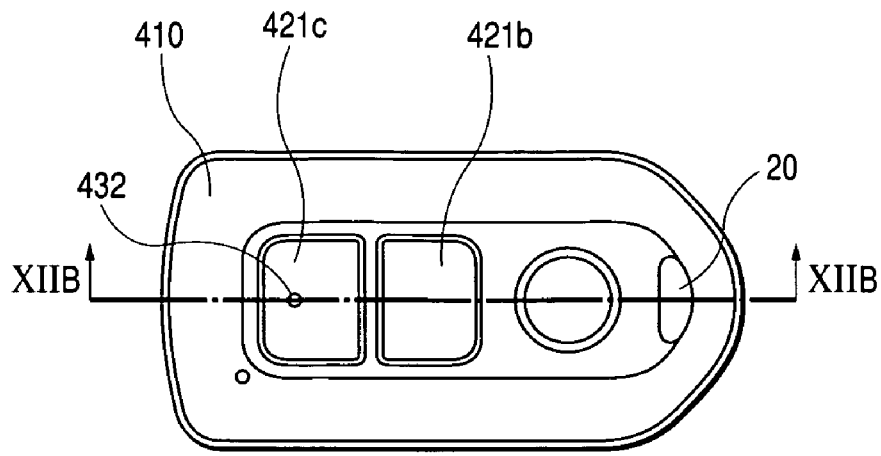
FIG. 12 includes FIG. 12A being a plan view showing the upper cover of the portable equipment of FIG. 10 after the film in-mold formation, FIG. 12B being a sectional view taken along the line XIIB—XIIB in FIG. 12A and FIG. 12C being a sectional view taken along the line XIIB—XIIB in FIG. 12A in which a knob printing portion is flexed in shape of recess.
Figure 12B:
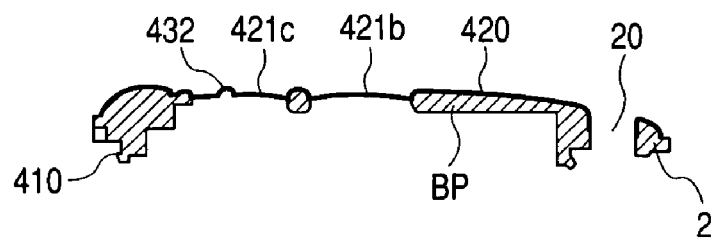
Figure 12C:
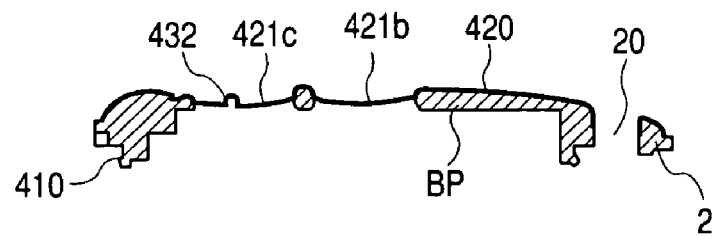

The decorative film 400 after the forming working is set to a molding machine, not shown, as like as the first embodiment, and subjected to the injection molding by the film in-mold method so as to inject the base material resin (i.e. resin base member) BP of polycarbonate to the side of the printed layer 103. Further, FIG. 12A is a plan view of the upper case cover 2 formed by the film in-mold method, and with reference to FIG. 12C, it will be seen that the knob printed portions 421b and 421c are deformable in a concave shape (recess) by a force of operating the knobs.

According to the portable equipment case according to the second embodiment of the present invention, as like as the first embodiment, the transparent protection film 102 as the front surface of the protective film 400 is exposed to the most outside surface of the case of the portable equipment 1, and the printed layer 103 is sandwiched, on the rear surface of the decorative film 400, between the resin film 101 and the base material resin BP. Accordingly, the surface of the printed layer 103 can be prevented from being damaged by a metallic article, and on the other hand, the printed layer 103 can be observed from the outside thereof through the transparent protection film 102 and the transparent resin film 101.

In addition, the thickness of the metallic layer 103 containing the metallic component can be made thin even in comparison with a coat film. Therefore, the metallic feeling can be given to the case of the portable equipment 1 by the metallic printed portions 410 and 210, and moreover, an adverse influence to be given to the electric wave performance of the antenna element 6 disposed inside the portable equipment 1 can be made minimal.

Still furthermore, in the second embodiment of the present invention, the knob printed portions 421b and 421c as function portions covering the switches 51b and 51c of the circuit board 5 are formed integrally with the decorative film 400 forming the body color printed portion 420 and the metallic printed portion 410. Accordingly, there exists substantially no gap between the function portion and the body portion of the case surface, thus improving the water-proof ability, dust-proof ability and the like to the case of the portable equipment.

Other Embodiments

Further, it is to be noted that the present invention is not limited to the described embodiments and many other changes and modifications may be made without departing from the scopes of the appended claims.

For example, in the described embodiments, the transparent polycarbonate (PC) film is utilized for the resin film 101 as the base of the decorative film. In an alternation, however, a transparent polyetylenetelephthalate (PET) may be used. Further, the resin film thickness may be selected in a range of 0.18 to 0.5 mm to thereby easily form or mold the decorative film at the forming working.

In addition, there is also used, for the resin film 101, a translucent film other than the transparent one to obtain mette metallic feeling.

As the resin base member or base material resin BP, there may be utilized, other than the PC, a mixture resin of the PC and ABS resin. In such case, it is desired, in order to enhance the moldability in the film in-mold process, that the linear expansion coefficients of the resin film and the base material resin BP of the decorative film accord or substantially accord with each other.

What is claimed is:

1. A case of a portable equipment for communication to an external system comprising:
   a body portion; and
   an operation portion acting as a function member, wherein at least a portion of the body portion and the operation portion is provided with: a decorative film having a resin film having transparency and a print layer printed on a back surface of the resin film in a predetermined pattern; and a base member resin portion formed on a back surface of the decorative film so as to contact the print layer, and a decorative layer having a front surface exposed as a most outside surface of the case, wherein the front surface of the decorative film is provided with a marked portion formed as a protruded or recessed portion.

2. The case of the portable equipment according to claim 1, wherein said resin film has a front surface on which a transparent protection film is formed.

3. The case of a portable equipment according to claim 1, wherein said print layer is formed of a material containing a metallic component.

4. The case of a portable equipment according to claim 1, wherein said body portion has an inner hollow structure in which an antenna element for transmission is disposed.

5. The case of a portable equipment according to claim 1, wherein said operation portion includes knob pieces for inputting operation modes and said knob pieces have front surfaces covered by the decorative film.

6. The case of a portable equipment according to claim 5, wherein the print layer of the decorative film has a portion which covers the knob pieces and to which patterns representing contents of functions are printed.

7. The case of a portable equipment according to claim 1, wherein said body portion and said operation portion are covered integrally by the decorative film.

8. The case of a portable equipment according to claim 1, wherein said body portion and said operation portion are covered by independent decorative films, respectively.

9. A case of a portable equipment for communication to an external system comprising:
   a body portion; and
   an operation portion acting as a function member, wherein at least a portion of the body portion and the operation portion is provided with: a decorative film having a resin film having transparency and a print layer printed on a back surface of the resin film in a predetermined pattern; and a base member resin portion formed on a back surface of the decorative film so as to contact the print layer, and a decorative layer having a front surface exposed as a most outside surface of the case,
   wherein said decorative film has an end portion intruding into the base member resin portion.

10. The case of a portable equipment according to claim 1, wherein said body portion comprises two half portions having an inner hollow portion when assembled and said operation portion is formed to one of the two half portions.

11. A case of a portable equipment for communication to an external system comprising:
    a body portion having an inner hollow structure in which an antenna element is disposed for communication to the external system; and
    an operation portion acting as a function member having a surface on which knob pieces for inputting operation modes are formed,
    wherein at least a portion of the body portion and the operation portion is provided with: a decorative film having a resin film having a front surface on which a transparent protection film is formed and a print layer printed on a back surface of the resin film in a predetermined pattern, said print layer containing a metallic component; and a base member resin portion formed on a back surface of the decorative film so as to contact the print layer, and said transparent protection film is disposed as a most outside surface of the case,
    wherein the front surface of the decorative film is provided with a marked portion formed as a protruded or recessed portion.

12. The case of a portable equipment according to claim 11, wherein said body portion comprises two half portions having an inner hollow portion when assembled and said operation portion is formed to one of the two half portions.

13. A case of a portable equipment for communication to an external system comprising:
    a body portion having an inner hollow structure in which an antenna element is disposed for communication to the external system; and
    an operation portion acting as a function member having a surface on which knob pieces for inputting operation modes are formed,
    wherein at least a portion of the body portion and the operation portion is provided with: a decorative film having a resin film having a front surface on which a transparent protection film is formed and a print layer printed on a back surface of the resin film in a predetermined pattern, said print layer containing a metallic component; and a base member resin portion formed on a back surface of the decorative film so as to contact the print layer, and said transparent protection film is disposed as a most outside surface of the case, and
    wherein said decorative film has an end portion intruding into the base member resin portion.

* * * * *